(12) United States Patent
Luo et al.

(10) Patent No.: US 7,535,667 B2
(45) Date of Patent: May 19, 2009

(54) ERASE BAND COMPENSATED OFFSET SERVO TRIMMING

(75) Inventors: Peng Luo, Fremont, CA (US); Keung Youn Cho, San Jose, CA (US); Hao Ping Wen, Sunnyvale, CA (US); Shuyu Sun, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/810,188

(22) Filed: Jun. 4, 2007

(65) Prior Publication Data

US 2008/0297938 A1    Dec. 4, 2008

(51) Int. Cl.
*G11B 21/02* (2006.01)
(52) U.S. Cl. .............................................. 360/75
(58) Field of Classification Search ............. None
See application file for complete search history.

(56) References Cited

U.S. PATENT DOCUMENTS

| 4,541,026 | A  | * | 9/1985 | Bonin et al. ............... 360/121 |
| 5,412,516 | A  | * | 5/1995 | Kennedy et al. .............. 360/62 |
| 6,023,389 | A  | * | 2/2000 | Cunningham ................ 360/75 |
| 6,262,859 | B1 | * | 7/2001 | Cho ........................ 360/77.08 |
| 7,035,036 | B2 | * | 4/2006 | Shimomura et al. ........... 360/75 |
| 7,068,461 | B1 | * | 6/2006 | Chue et al. .................... 360/75 |
| 7,230,790 | B1 | * | 6/2007 | Mallary et al. ........... 360/77.08 |

* cited by examiner

*Primary Examiner*—K. Wong
(74) *Attorney, Agent, or Firm*—Ben J. Yorks; Irell & Manella LLP

(57) ABSTRACT

A hard disk drive with a disk that has a servo field with an A servo burst and a B servo burst. The A servo burst has a trimmed erase band. The trimmed erase band can be created by offsetting the write head relative to a burst centerline to reduce the width of the erase band. For example, the write head can be moved toward a centerline of the A servo burst. The offset can be a function of write current and cylinder location of the disk. The offsets are selected so that the resultant burst profiles do not contain a flat minimum portion.

8 Claims, 6 Drawing Sheets

ERASE BAND COMPENSATED OFFSET SERVO TRIMMING

BACKGROUND OF THE INVENTION

1. Field of the Invention

The present invention relates to a servo field on a disk of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

In general there are two types of recording heads used in commercial disk drive, horizontal recording heads and perpendicular recording heads. Perpendicular recording heads magnetize the disk in a direction perpendicular to the outer surface of the disk.

Data is stored on tracks located on the surfaces of the disks. Each track typically contains a plurality of sectors. A sector may have a servo field that is used to center the head on the track. The servo field contains a number of spaced apart servo bursts. By way of example, the servo field may include A and B servo burst. The amplitude of the servo bursts will vary depending on the position of the head relative to each burst. A position error signal is generated from the servo bursts. The position error signal is used to center the head on the track.

The servo burst are typically written with a servo writer during the manufacturing process of the disk drive. The writing of servo bursts is a relatively inaccurate process. The servo burst may overlap to create inaccurate servo data. For example, an A servo burst may extend into an area normally associated with the B servo burst. This may result in an inaccurate servo burst profile.

FIG. 1 shows a servo field with an A servo burst 1 and a B servo burst 2. The A servo burst 1 has erase bands 3. The erase bands 3 insure that the magnetized portion of the A burst 1 is not associated with the B servo burst 2.

As shown by the graphs in FIGS. 2 and 3 the width of the erase bands varies between the inner diameter and outer diameter of the disk for a disk drive that utilizes a perpendicular recording head. The problem is particularly acute for bi-directional servo writing. The width of the erase band can also vary as a function of servo frequency (spindle motor speed) and write current. These variations can create a burst profile 5 that has a flat portion 6 as shown in FIG. 1. In general, it is undesirable to have burst profiles with flat portions. It would be desirable to provide a scheme that compensates for the variations in the width of the erase bands to minimize or eliminate any flat portions of the burst profiles.

BRIEF SUMMARY OF THE INVENTION

A hard disk drive that includes a magnetic disk with at least one servo field. The servo field includes at least one servo burst that includes a trimmed erase band. The disk drive also includes a spindle motor that rotates the disk and a head coupled to the disk.

DETAILED DESCRIPTION

Disclosed is a hard disk drive with a disk that has a servo field with an A servo burst and a B servo burst. The A servo burst has a trimmed erase band. The trimmed erase band can be created by offsetting the write head relative to a burst centerline to reduce the width of the erase band. For example, the write head can be moved toward a centerline of the A servo burst. The offset can be a function of write current and cylinder location of the disk. The offsets are selected so that the resultant burst profiles do not contain a flat minimum portion.

Figure 4:
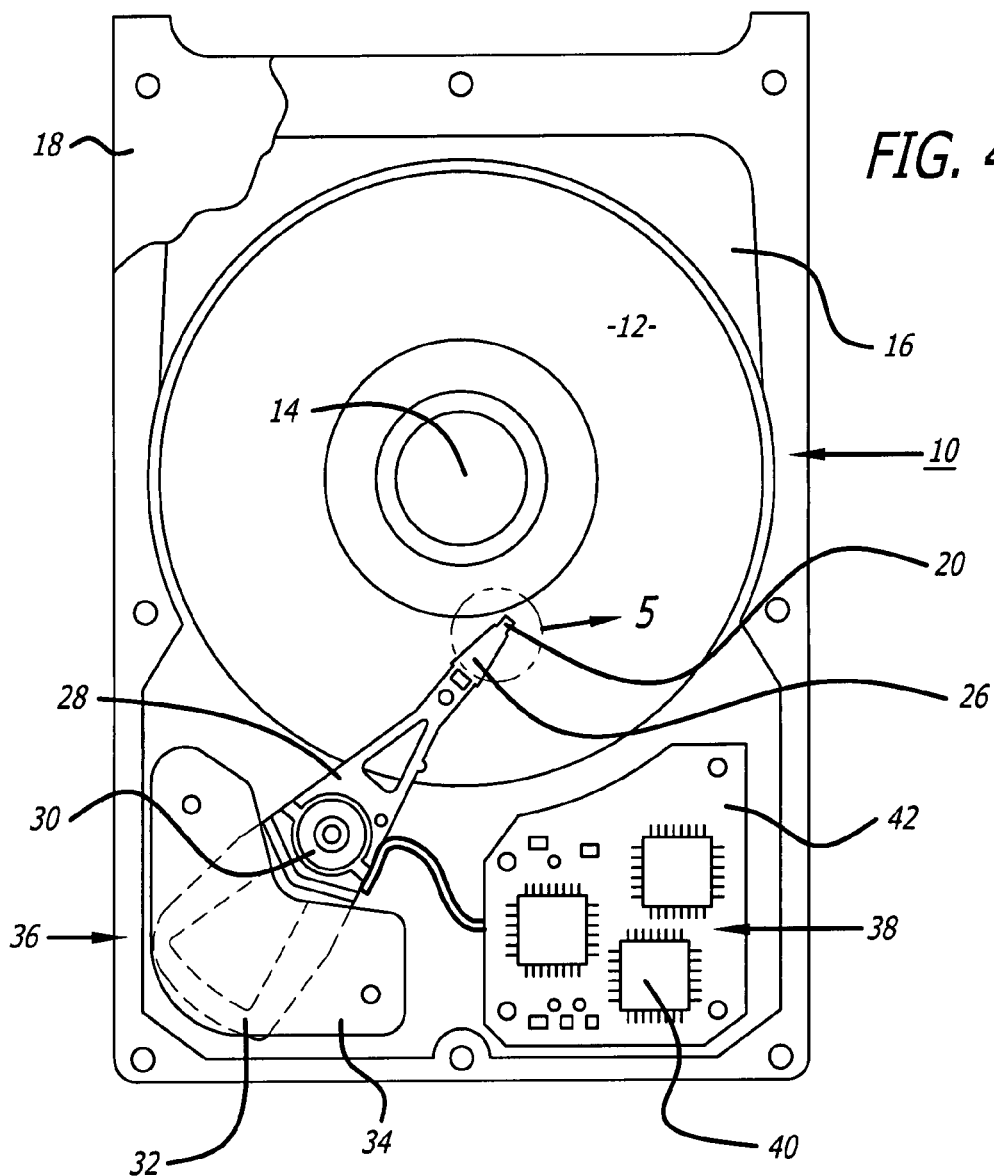
FIG. 4 is a top view of an embodiment of a hard disk drive.

Referring to the drawings more particularly by reference numbers, FIG. 4 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 5:
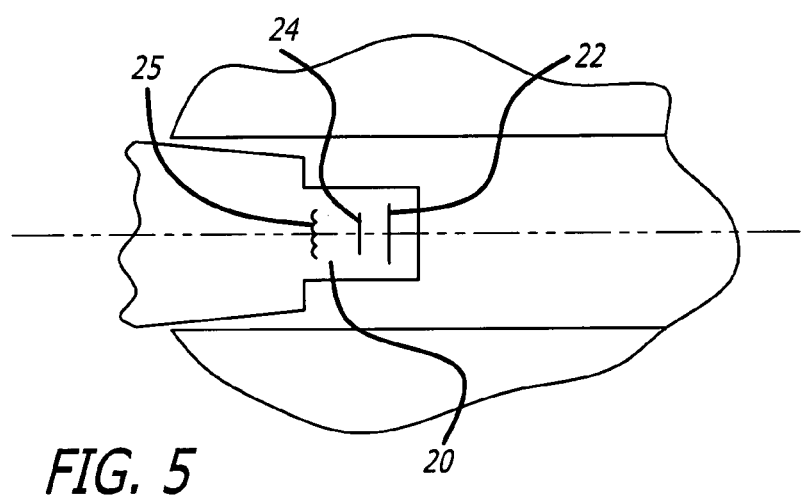
FIG. 5 is a top enlarged view of a head of the hard disk drive.

The disk drive 10 may include a plurality of heads 20 located adjacent to the disks 12. As shown in FIG. 5 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The write element 22 can magnetize the disk in a vertical direction. Vertical magnetization is commonly referred to as perpendicular recording.

Referring to FIG. 4, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 6:
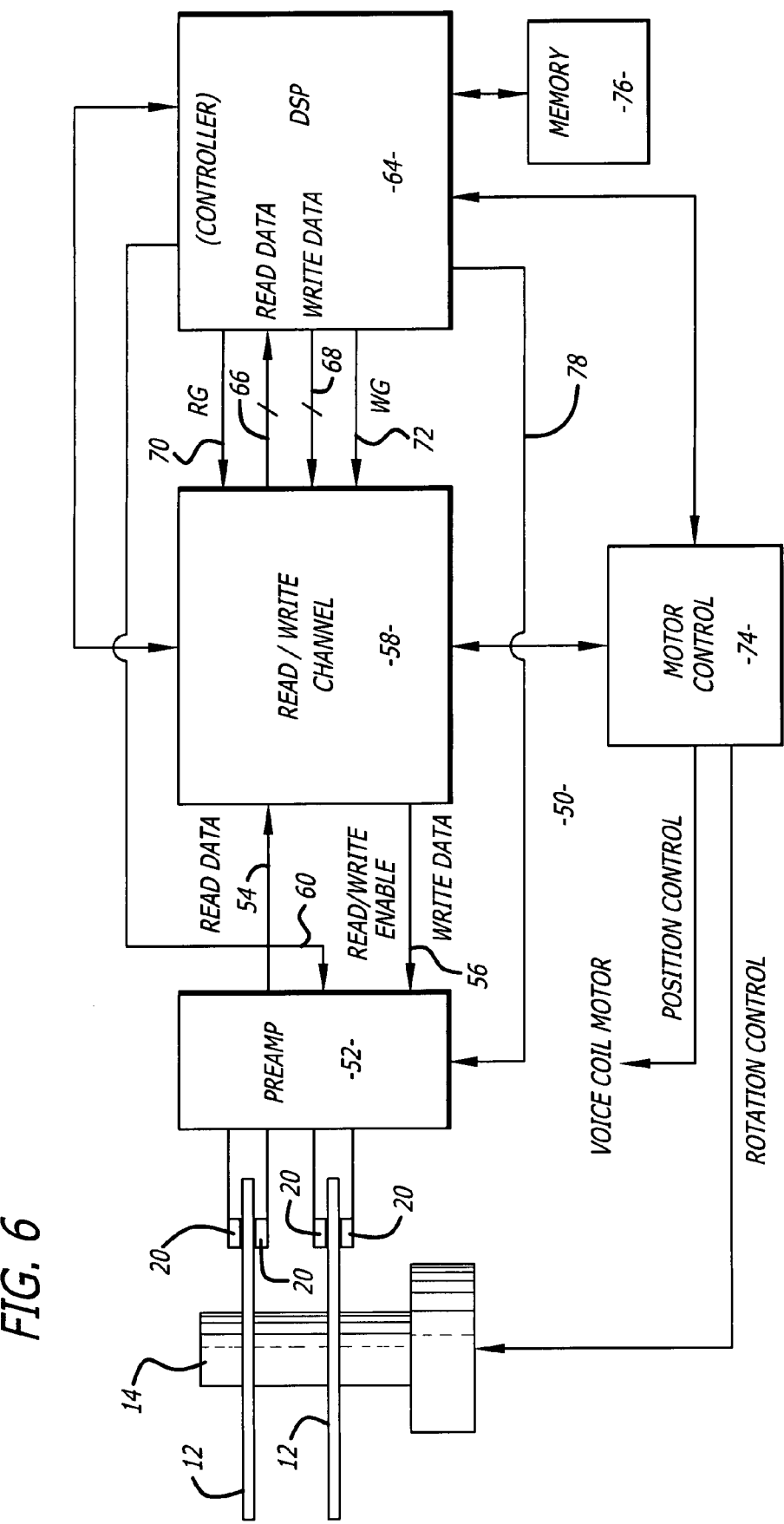
FIG. 6 is a schematic of an electrical circuit for the hard disk drive.

FIG. 6 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

Figure 1:
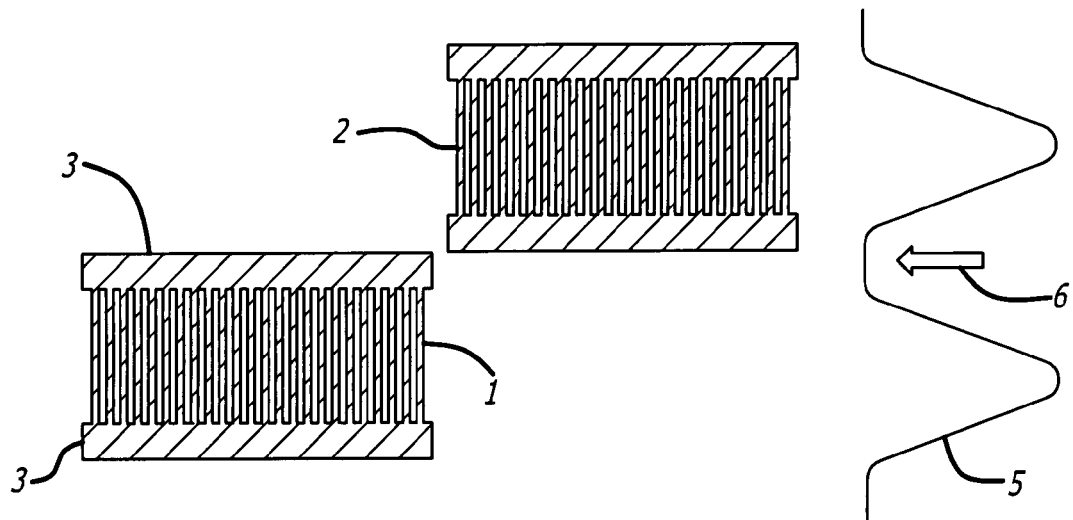
FIG. 1 is an illustration of a servo burst field of the prior art.
Figure 7:
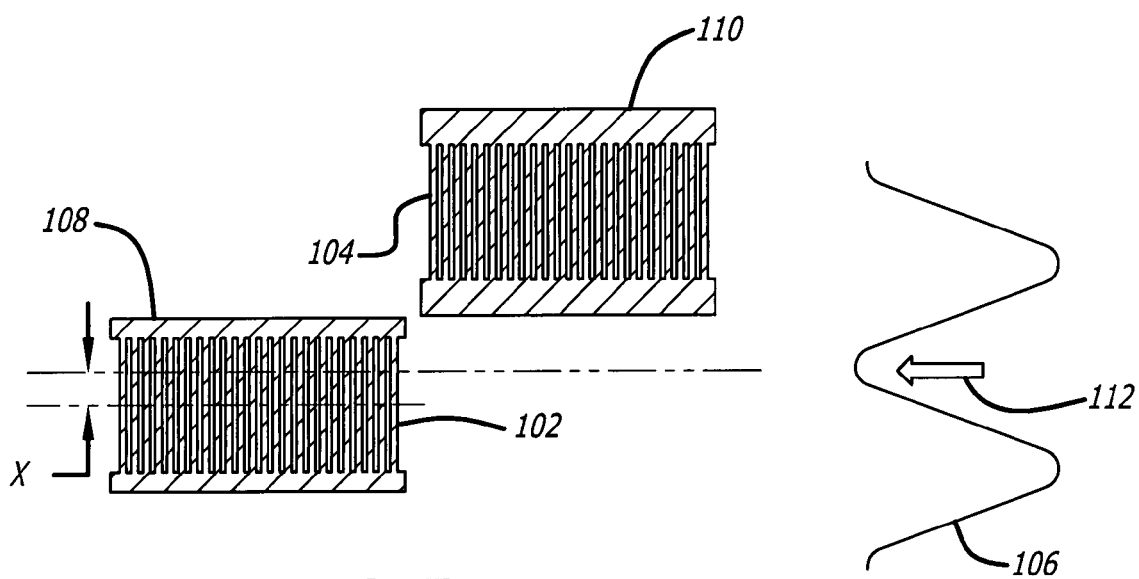
FIG. 7 is an illustration showing a servo pattern.
Figure 2:
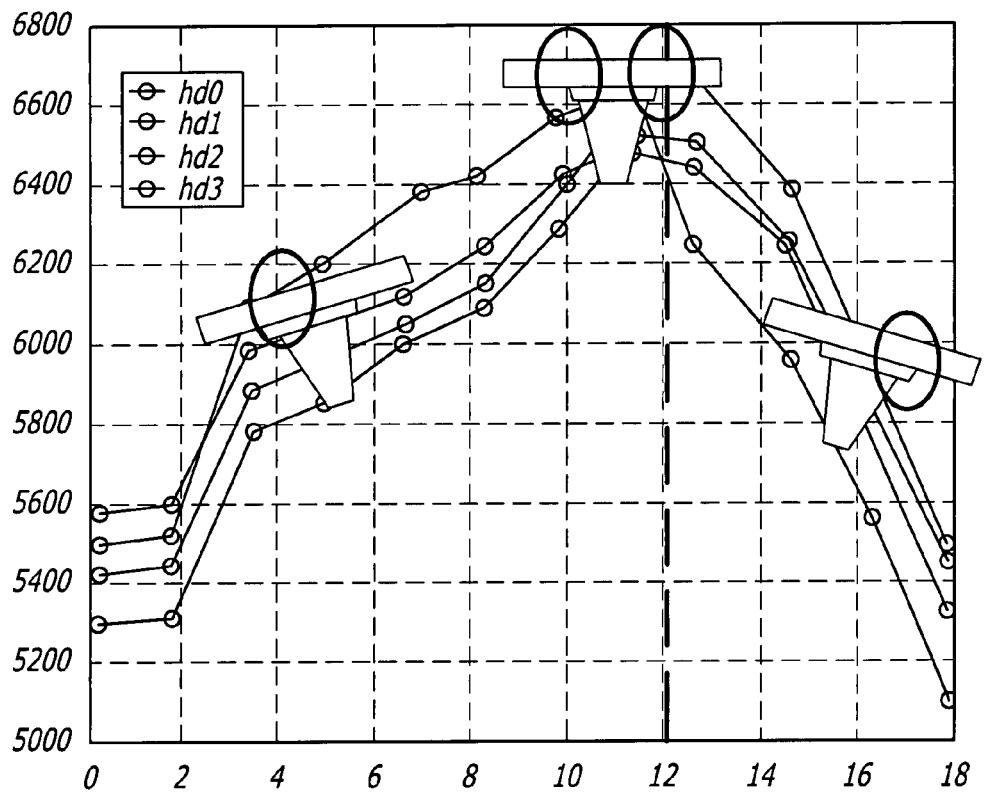
FIG. 2 is a graph showing variations in the width of erase bands as a function of the disk cylinder locations for bi-directional servo writing.
Figure 3:
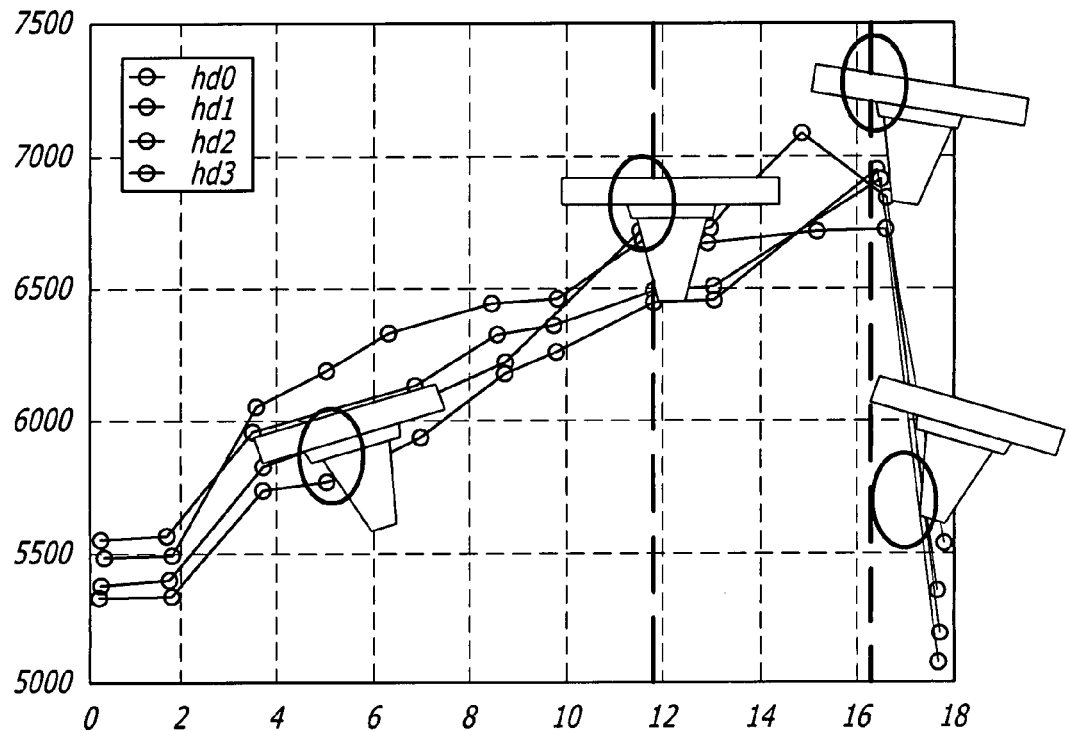
FIG. 3 is a graph showing variations in the width of the erase bands as a function of the disk cylinder locations for single direction servo writing.

FIG. 7 shows a servo pattern 100 on a disk. The servo pattern 100 may include an A servo burst 102 and a B servo burst 104. The A and B burst signals are used to create a burst profile 106. The burst profile is used to determine a position error signal ("PES"). The PES is used to move and position the head onto the center of the track.

The A servo burst 102 has a pair of trimmed erase bands 108. The B servo burst 104 may also have a pair of trimmed erase bands 110. The erase bands are trimmed so that the minimum amplitude region 112 of the profile 106 does not have a flat minimum portion.

Figure 8:
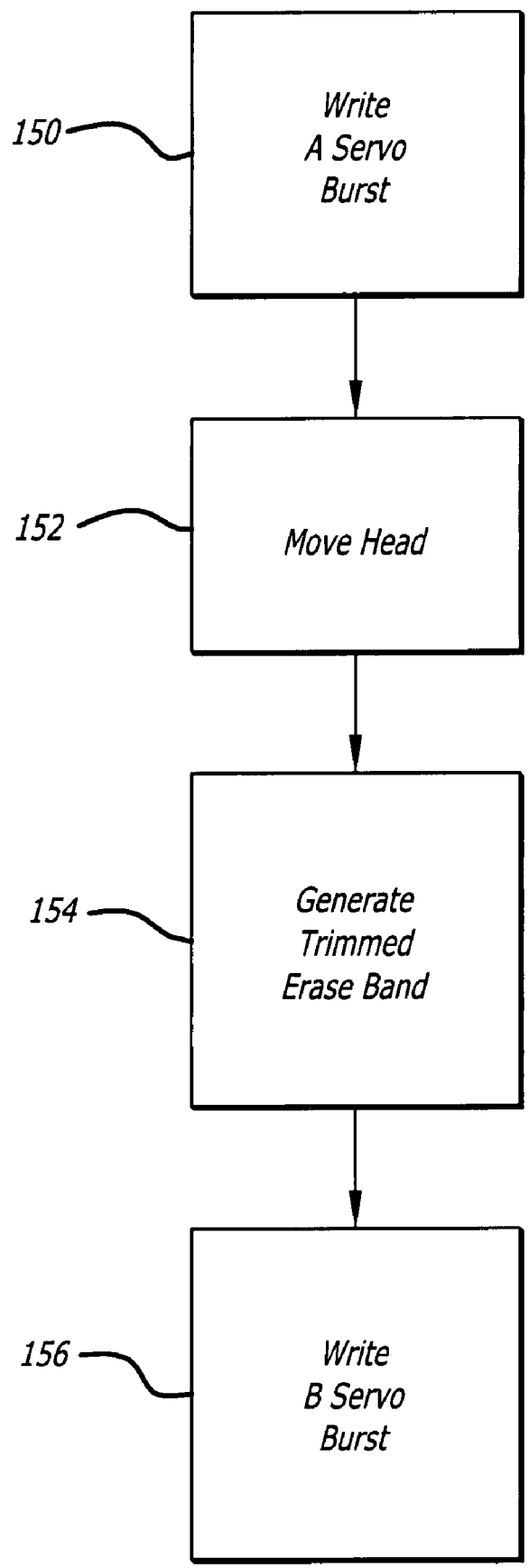
FIG. 8 is a flowchart describing a method for creating a trimmed erase band.
Figure 9:
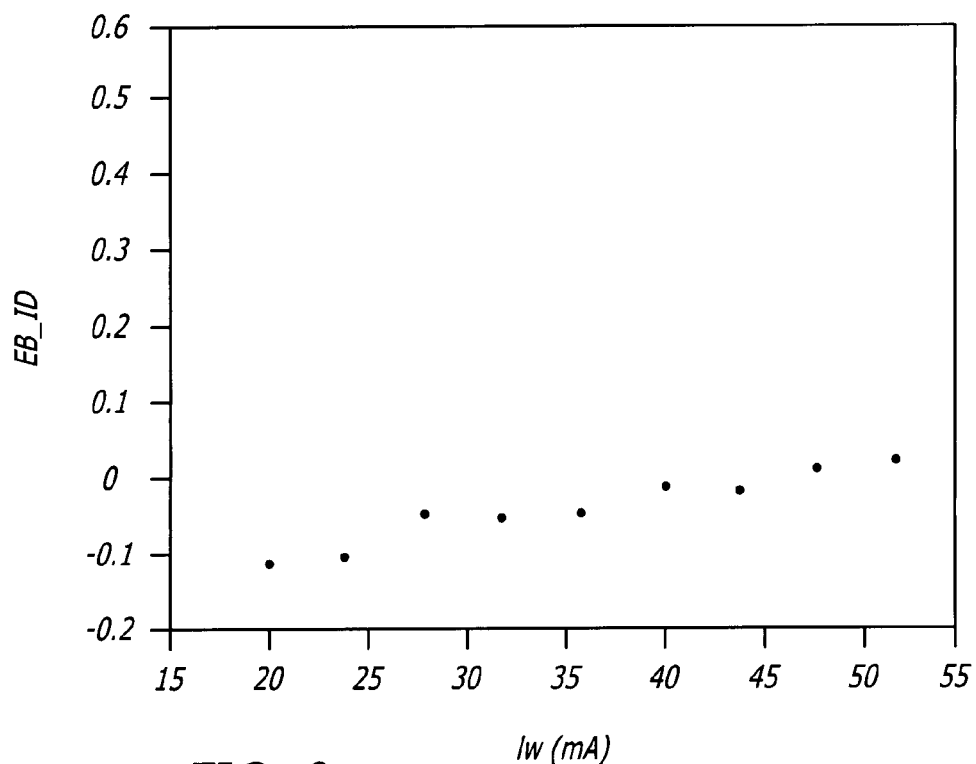
FIG. 9 is a graph showing an erase band offset as a function of write current when the head is at an inner diameter of the disk.
Figure 10:
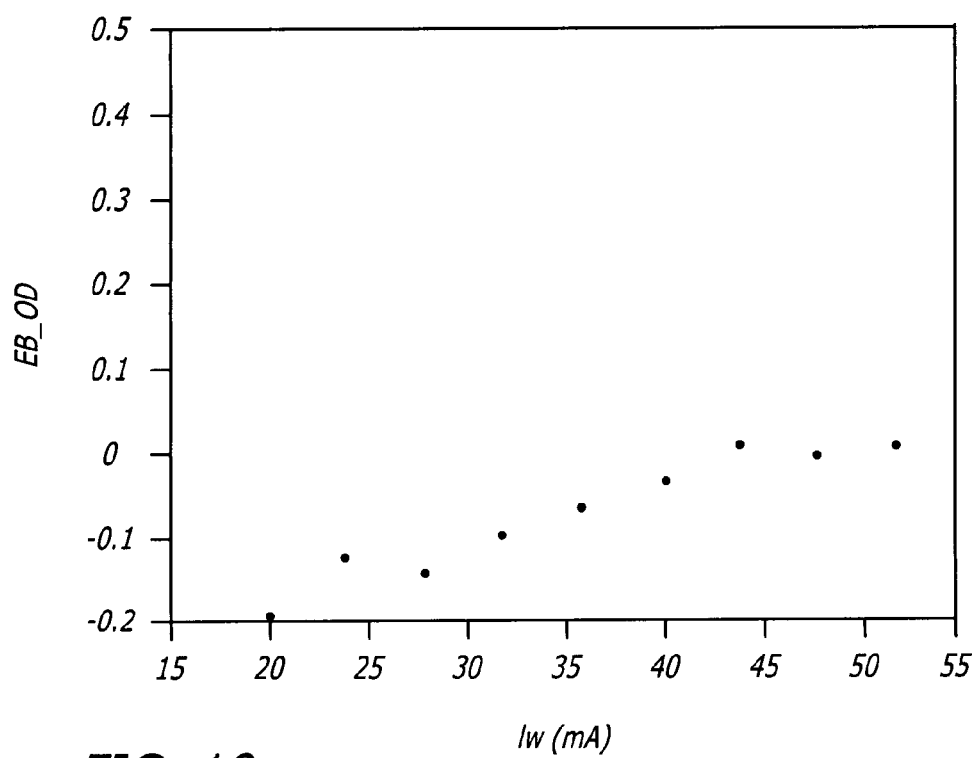
FIG. 10 is a graph showing an erase band offset as a function of write current when the head is at an outer diameter of the disk.

FIG. 8 describes a method for creating A and B servo burst with trimmed erase bands. The method is typically performed by a servo writer. In step 150 an A servo burst is written with a write head. In step 152 the head is moved a predetermined distance. The distance may include an offset X relative to a centerline of the A servo burst as shown in FIG. 7. The offset X may be determined by the graphs shown in FIGS. 9 and 10. The graph shown in FIG. 9 shows the offset as a function of write current when the write head is located at an inner diameter of the disk. FIG. 10 shows a graph that provides offsets as a function of write current when the head is at an outer diameter of the disk. Similar graphs can be generated for different zones or track cylinders of the disk. Likewise, graphs can be created for different servo frequencies.

After the write head is moved the trimmed erase band is created in step 154. The head is moved again and the B servo burst is created in step 156. The process can be repeated to generate a plurality of servo bursts across the surface of the disk.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a magnetic disk that has at least one servo field on a track, said servo field includes an A servo burst that includes a trimmed erase band and a B servo bursts having a trimmed erase band, said A and B servo burst generate a combined burst profile signal that does not have a flat minimum portion;
   a spindle motor that rotates said disk;
   a head coupled to said disk; and,
   a controller coupled to said head.

2. The disk drive of claim 1, wherein said servo burst is an A servo burst that has a centerline, said trimmed erase band is created by moving said head to a position offset from said centerline of said A servo burst.

3. The disk drive of claim 1, wherein said head is a perpendicular recording head.

4. The disk drive of claim 1, wherein said servo burst has a pair of trimmed erase bands.

5. A method for creating a servo burst on a disk of a hard disk drive, comprising:
   writing an A servo burst with a head;
   creating a trimmed erase band in the A servo burst with the head;
   writing a B servo burst will a head;
   creating a trimmed erase band in the B servo burst with the head; and,
   reading the A and B servo burst will the head to create a combined burst signal profile that does not have a flat minimum portion.

6. The method of claim 5, wherein the A servo burst has a centerline and the trimmed erase band is created by moving the head a position offset relative to the A servo burst centerline.

7. The method of claim 5, wherein the head is a perpendicular recording head.

8. The method of claim 5, further comprising creating a second erase band in the A servo burst.

* * * * *